United States Patent
Lelkes et al.

(10) Patent No.: US 7,095,189 B2
(45) Date of Patent: Aug. 22, 2006

(54) METHOD FOR CONTROLLING A BRUSHLESS ELECTRIC MOTOR

(75) Inventors: András Lelkes, Stuttgart (DE); Michael Bufe, Duerbheim (DE)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 11/103,295

(22) Filed: Apr. 11, 2005

(65) Prior Publication Data

US 2005/0231139 A1 Oct. 20, 2005

(30) Foreign Application Priority Data

Apr. 20, 2004 (DE) ............... 10 2004 019 004

(51) Int. Cl.
*H02P 5/00* (2006.01)
*H02P 5/46* (2006.01)
(52) U.S. Cl. ............... 318/66; 318/138; 318/254; 318/439; 318/599; 318/700
(58) Field of Classification Search ........... 318/599, 318/66, 138, 254, 439, 700, 432–434
See application file for complete search history.

(56) References Cited

U.S. PATENT DOCUMENTS

| | | | | |
|---|---|---|---|---|
| 3,870,860 A | * | 3/1975 | Steiner | 392/351 |
| 4,843,532 A | * | 6/1989 | Freedman | 363/26 |
| 5,075,608 A | * | 12/1991 | Erdman et al. | 318/599 |
| 5,963,706 A | * | 10/1999 | Baik | 388/804 |
| 6,020,715 A | * | 2/2000 | Yasohara et al. | 318/808 |
| 6,040,668 A | * | 3/2000 | Huynh et al. | 318/471 |
| 6,091,887 A | * | 7/2000 | Dieterle et al. | 388/811 |
| 6,426,602 B1 | * | 7/2002 | McCann et al. | 318/432 |
| 6,650,074 B1 | * | 11/2003 | Vyssotski et al. | 318/254 |
| 6,713,977 B1 | | 3/2004 | Sutter et al. | |
| 6,762,636 B1 | * | 7/2004 | Khawshe | 327/175 |
| 6,997,684 B1 | * | 2/2006 | Hahn et al. | 417/44.1 |
| 2003/0071595 A1 | * | 4/2003 | Cho et al. | 318/599 |
| 2004/0195989 A1 | * | 10/2004 | Harriman et al. | 318/599 |

FOREIGN PATENT DOCUMENTS

| | | |
|---|---|---|
| DE | 10044742 A1 | 4/2001 |
| JP | 11-334630 | * 12/1999 |
| JP | 11-341877 | * 12/1999 |

OTHER PUBLICATIONS

Jorg Merwerth, Entwurf und Optimierung einer permanenterregten Synchronmaschine fur den Antrieb einer Herzunterstutzungspumpe, Elektrotechnik 2003, pp. 25, 44-47.

* cited by examiner

*Primary Examiner*—Rina Duda
*Assistant Examiner*—Tyrone Smith
(74) *Attorney, Agent, or Firm*—Baker & Daniels

(57) ABSTRACT

The invention relates to a method for controlling a brushless electric motor for operation within a specified supply voltage range, a motor control controlling the winding voltage by means of pulse width modulation (PWM) and regulating the rotational speed to a specified speed. According to the invention, the motor is so rated that the nominal rotational speed is just achieved at the nominal operating point at the nominal supply voltage and at the maximum PWM ratio.

11 Claims, 2 Drawing Sheets

METHOD FOR CONTROLLING A BRUSHLESS ELECTRIC MOTOR

CROSS REFERENCE AND RELATED APPLICATION

This application is based on a German patent application (10 2004 019 004.6) filed Apr. 20, 2004, and the contents of the patent application are incorporated herein by reference.

BACKGROUND OF THE INVENTION

The invention relates to a method for controlling a brushless electric motor.

Prior art

Brushless DC motors for applications in fans, operating with or without a closed-loop control, are known.

The rotational speed of a brushless DC motor that does not have a closed-loop control is dependent on the supply voltage (see FIG. 1). The higher the supply voltage, the higher is the rotational speed of the motor. In some applications, for example in motor vehicles, fan motors having a nominal supply voltage of 12 V are used. The on-board voltage of motor vehicles, however, can vary, ranging between 8 V and 18 V, which means that the rotational speed of the motor can also fluctuate greatly. In fan applications, the mechanical power output rises at approximately the cube of the rotational speed. As the supply voltage increases, the rotational speed of the uncontrolled motor rises. As a result, the load on the motor also increases which means that thermal overloading of the motor can easily occur if the supply voltage is too high.

If other parameters and environmental influences are ignored, the table below shows how a change in rotational speed, caused by an increase in the supply voltage, of an uncontrolled electric motor that is used as a fan motor can affect other motor or fan parameters:

| Speed | Motor output power | Air volume | Static pressure rise | Fan noise |
|---|---|---|---|---|
| +10% | +33% | +10% | +21% | +2.3 dB(A) |
| +20% | +73% | +20% | +44% | +4.4 dB(A) |
| +30% | +120% | +30% | +69% | +6.3 dB(A) |

Thus at higher rotational speeds the fan delivers more air which, however, is normally not required by the user since the fan is designed to deliver a sufficient amount of air, for the entire supply voltage range. What is more, as the rotational speed increases, not only does the load on the motor increase but also the noise of the fan. This increase in load not only means an increase in energy consumption, but also increased motor self-heating, which in turn has a negative impact on the useful life of the bearing system.

For motors that have a closed-loop control, the output power remains constant (FIG. 2). Hence a decrease in the supply voltage leads to an increase in current consumption, which means that the power electronics, in particular, have to be designed for these currents. In the case of a motor having an active closed-loop control, the rotational speed, motor output power, air volume, pressure increase and the fan noise, independent of the supply voltage, remain constant. In this case, the motor is so rated that even at the minimum permitted supply voltage, it can achieve the maximum required rotational speed even at maximum load. Problems could occur, however, for motors having integrated commutation electronics since the power electronics have to deliver constant power even at a reduced supply voltage and thus consume a higher current as shown in the following table:

| Supply voltage | Input current |
|---|---|
| −10% | +11% |
| −20% | +25% |
| −30% | +43% |

If, in the above example, the voltage drops from a nominal value of 12 V to 8.4 V (−30%), the input current of the power electronics rises by approx. 43%. The power loss, i.e. the thermal load on the power semiconductors of the commutation electronics, also increases to a corresponding extent.

One way of avoiding this problem, in addition to having a closed-loop control, is to have the supply voltage measured by the motor control and to then make an appropriate adjustment to the PWM ratio. This, however, goes to increase the costs of the sensors, which means that this kind of solution is generally out of the question for low-cost motors due to the expenses involved.

SUMMARY OF THE INVENTION

The object of the invention is to provide a method for controlling a brushless electric motor in which neither a reduction nor an increase in operating voltage produces an increase in the load on the components of the motor.

The solution is based on a motor having a closed-loop control in which, however, a control reserve in the low voltage range has been foregone in accordance with the prior art.

Alongside its possible application as a pump motor, another particular application for the electric motor according to the invention is as a fan motor.

According to the invention, a motor control preferably based on pulse width modulation (PWM) is used, the motor operating with a closed-loop control and being rated so that the motor just achieves its specified nominal speed with nominal load at nominal supply voltage. Should, in this event, the supply voltage rise above the nominal value, the control prevents the speed from increasing.

If the supply voltage falls below the nominal voltage at full motor load, the control rapidly reaches the maximum PWM ratio. From this point on, the PWM ratio cannot be increased any further, which is why the input current cannot rise any further either. Instead, due to the reduced voltage and the consequent decline in current consumption, the motor rotates more slowly and the motor load also decreases (power loss).

An embodiment of the invention is compared to the prior art and described in more detail below on the basis of the drawings.

DESCRIPTION OF A PREFERRED EMBODIMENT OF THE INVENTION

Figure 1:
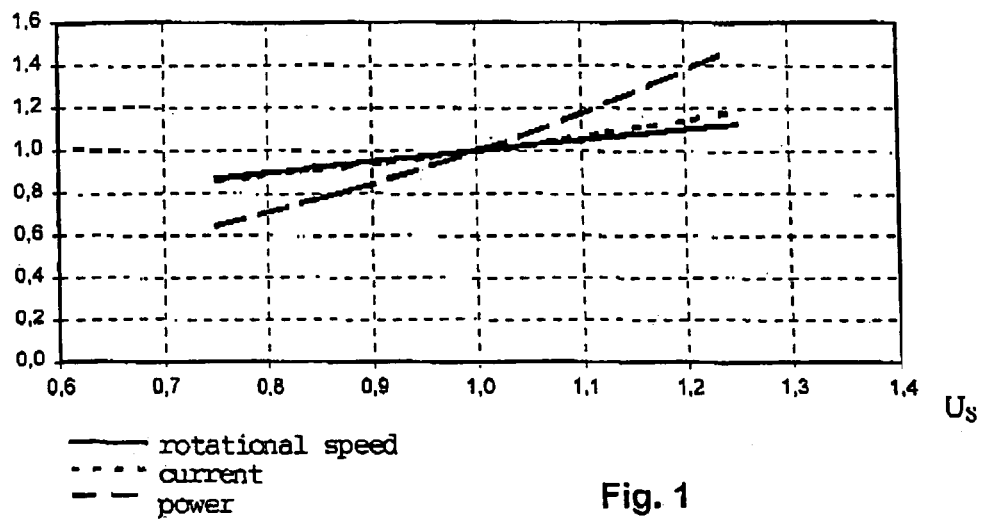
FIG. 1 is a diagram of the relative speed, motor current and input power of a brushless fan drive without a closed-loop control (prior art), as a function of the relative supply voltage.
Figure 2:
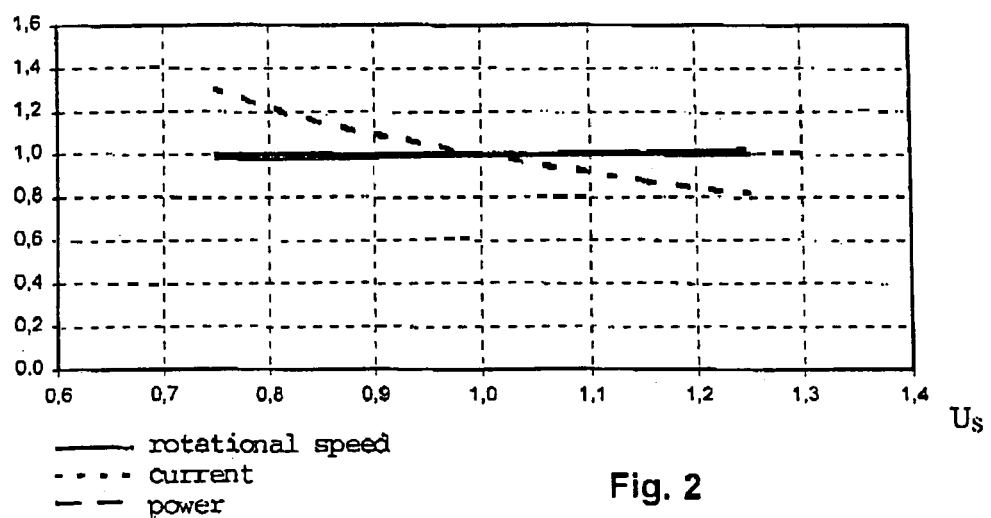
FIG. 2 is a diagram of the relative speed, motor current and input power of a brushless fan drive having a closed-loop control (prior art), as a function of the relative supply voltage.
Figure 3:
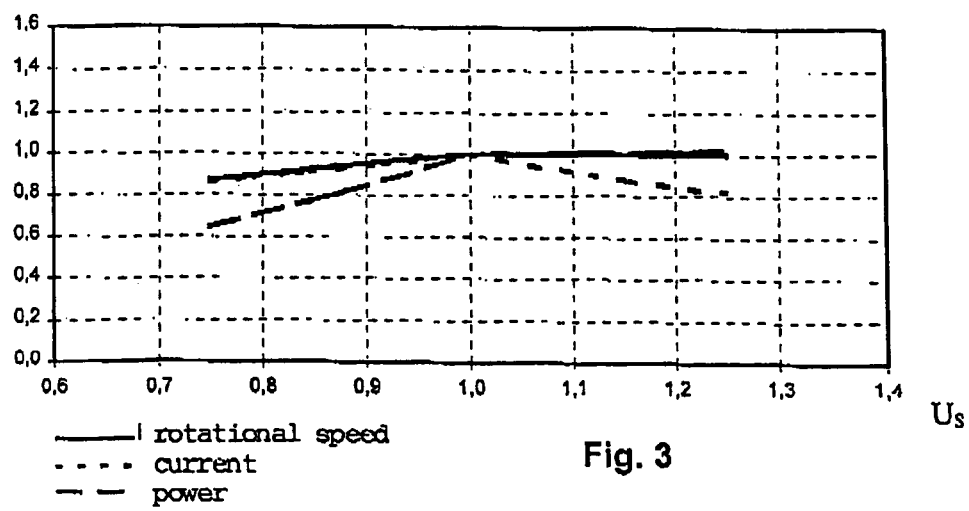
FIG. 3 is a diagram of the relative speed, motor current and input power of a brushless fan drive having a closed-loop control according to the invention, as a function of the relative supply voltage.

In FIGS. 1 to 3, the rotational speed is shown as an unbroken line, the current as a dotted line and the power as a dashed line, plotted against the voltage. The parameters have been normalized to the nominal speed, the nominal current and the nominal power as well as the nominal voltage.

FIG. 1 shows a diagram of the relative speed, motor current and input power (nominal value=1.0) of a brushless fan drive without a closed-loop control according to the prior art, as a function of the relative supply voltage (nominal value=1.0). It can be clearly seen that all values show an approximately linear growth as the supply voltage increases.

This results in an increase in energy consumption, higher losses in the motor and in the commutation electronics, as well as an increase in flow noise, particularly when the supply voltage is higher than the nominal voltage (1.0).

FIG. 2 shows a diagram of the relative speed, motor current and input power of a brushless fan drive having a closed-loop control according to the prior art, as a function of the relative supply voltage. Due to the overspeed control, the speed and input power remain constant even for supply voltages that deviate from the nominal voltage. At low supply voltages falling below the nominal voltage (=1.0), the motor current increases. This results in a higher current load on the commutation electronics and on the supply lines.

FIG. 3 shows the characteristics of a fan drive according to the invention. To control the electric motor, a motor control is used that controls the motor current by means of pulse width modulation (PWM) and limits the rotational speed to a maximum specified speed. It is important that the motor or the motor control respectively, is so rated that with a nominal load at the nominal supply voltage, the nominal speed is just achieved, the maximum pulse-duty factor being almost attained.

The diagram of the relative speed, motor current and input power of a motor according to the invention depicted as a function of the relative supply voltage in accordance with FIG. 3 shows that at supply voltages larger than the nominal voltage, the speed and input power remain constant due to the overspeed control. Here, the motor current drops off and remains non-critical. At supply voltages smaller than the nominal voltage, both speed and input power decline since the motor current cannot be increased because the maximum PWM ratio has already been attained at the nominal voltage.

It can also be seen from FIG. 3 that the motor current reaches its maximum at the nominal operating point (position 1.0/1.0).

Figure 4:
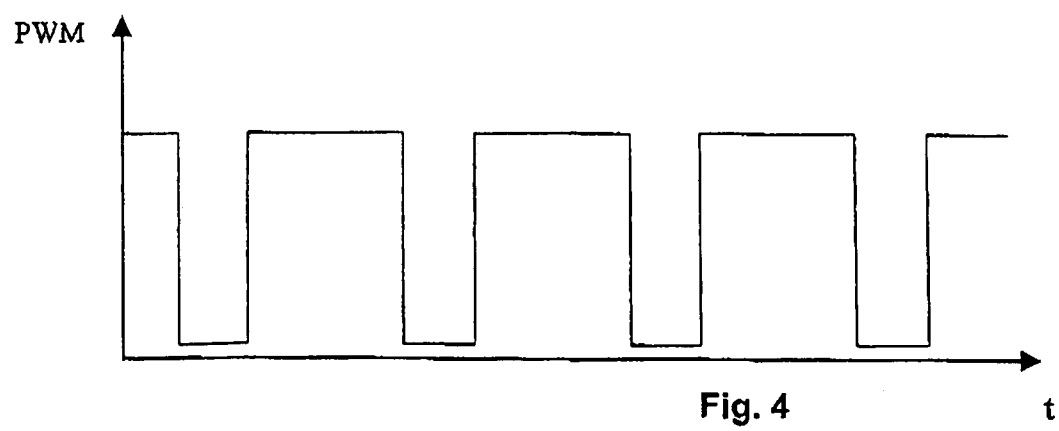
FIG. 4 shows an exemplary waveform of the PWM control signal at a supply voltage that is significantly higher than the nominal supply voltage of the fan drive.

FIG. 4 schematically illustrates the PWM control signal at a supply voltage significantly above the nominal supply voltage.

If the supply voltage is reduced, the closed-loop control increases the PWM ratio.

Figure 5:
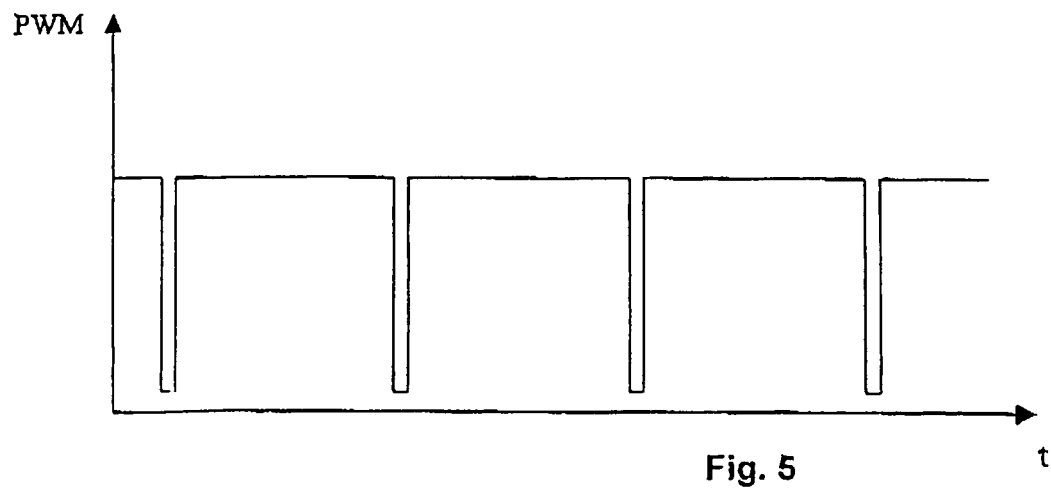
FIG. 5 shows an exemplary waveform of the PWM control signal at a nominal supply voltage.

FIG. 5 schematically illustrates the PWM control signal at a supply voltage slightly larger than the nominal supply voltage. Should the supply voltage drop even further, the pulse-duty factor cannot be increased at all or barely increased.

In many cases, the motor rating according to the invention can be realized by means of an appropriate winding design. This means that the magnetic circuit and the commutation electronics need not be changed. One possible way of arranging the winding design according to the invention is as follows:

For example, a fan with a prototype motor having a known winding design (wire diameter $d_0$, number of windings per tooth $N_0$) is examined. The fan can either be built into the actual application or into a test rig that has a similar current-resistance characteristic as the actual application. In this case, the nominal operating point (air flow and pressure) is achieved at the nominal speed. The supply voltage at which the motor just reaches this nominal speed can be determined through experimentation. When this limiting value $U_{Limit}$ is known and the nominal supply voltage is $U_{Nom}$, the winding according to the invention can be easily calculated by:

Wire diameter:

$$d = d_0 \sqrt{\frac{U_{Limit}}{U_{Nom}}}$$

Number of windings:

$$N = N_0 \frac{U_{Nom}}{U_{Limit}}$$

Identification Reference List $U_S$ Supply voltage
t Time
PWM Pulse width modulation
$U_{Nom}$ Nominal supply voltage
$U_{Limit}$ Cut-off voltage
N, $N_0$ Number of windings
d, $d_0$ Wire diameter

The invention claimed is:

1. A method for controlling a brushless electric motor for operation within a specified supply voltage range, comprising:
controlling the winding voltage by means of pulse width modulation (PWM) and regulating the rotational speed of the motor to a specified given value;
the motor being so rated that a nominal rotational speed is achieved at a nominal operating point at a nominal supply voltage and at a maximum PWM ratio;
if the supply voltage falls below the nominal voltage, operating the motor at the maximum PWM ratio; and
if the supply voltage exceeds the nominal voltage, regulating the rotational speed to the given value and causing the input power to the motor and the rotational speed to remain constant.

2. A method according to claim 1, wherein the rotational speed is derived from a commutation signal.

3. A method according to claim 1, wherein the motor rating is realized by an appropriate choice of winding wire diameter and number of windings.

4. A method according to claim 2, wherein the motor rating is realized by an appropriate choice of winding wire diameter and of the number of windings.

5. A brushless electric motor for operation within a specified voltage range, comprising:
- a motor control controlling winding voltage by means of pulse width modulation (PWM) and regulating rotational speed of the motor to a given maximum speed;
- the motor being so rated that a nominal rotational speed is achieved at a nominal operating point at a nominal supply voltage and at a maximum PWM ratio;
- if the supply voltage falls below the nominal voltage, the control operating the motor at the maximum PWM ratio; and
- if the supply voltage exceeds the nominal voltage, the control regulating the rotational speed to the given value and causing input power to the motor and the rotational speed to remain constant.

6. A brushless electric motor according to claim 5, wherein the motor rating is realized by an appropriate choice of winding wire diameter and number of windings.

7. A brushless electric motor according to claim 5, wherein electronic commutation and closed-loop control are realized by means of a microcontroller.

8. A brushless electric motor according to claim 5, wherein the electric motor is a fan motor.

9. A brushless electric motor according to claim 6, wherein electronic communication and closed-loop control are realized by means of a microcontroller.

10. A brushless electric motor according to claim 6, wherein the electric motor is a fan motor.

11. A brushless electric motor according to claim 7, wherein the electric motor is a fan motor.

* * * * *